(12) United States Patent
Kinoshita

(10) Patent No.: US 12,165,376 B2
(45) Date of Patent: Dec. 10, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Hayato Kinoshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 453 days.

(21) Appl. No.: 17/402,590

(22) Filed: Aug. 15, 2021

(65) Prior Publication Data
US 2022/0309284 A1    Sep. 29, 2022

(30) Foreign Application Priority Data
Mar. 25, 2021    (JP) .................................. 2021-051349

(51) Int. Cl.
| | |
|---|---|
| G06K 9/62 | (2022.01) |
| G06F 18/2431 | (2023.01) |
| G06V 10/22 | (2022.01) |
| G06V 30/413 | (2022.01) |
| G06F 21/31 | (2013.01) |

(52) U.S. Cl.
CPC ........ *G06V 10/235* (2022.01); *G06F 18/2431* (2023.01); *G06V 30/413* (2022.01); *G06F 21/31* (2013.01)

(58) Field of Classification Search
None
See application file for complete search history.

(56) References Cited

U.S. PATENT DOCUMENTS

| | | | |
|---|---|---|---|
| 8,300,955 B2* | 10/2012 | Nishimura ........... | A61B 5/7264 382/160 |
| 9,875,401 B2* | 1/2018 | Adachi ............... | G06V 30/1983 |
| 10,013,606 B2* | 7/2018 | Adachi ............... | G06V 30/1983 |
| 10,541,999 B1* | 1/2020 | Rosenberg ........... | G06V 40/172 |
| 11,257,203 B2* | 2/2022 | Ranca ..................... | G06N 20/20 |
| 2016/0162639 A1* | 6/2016 | Parbery .................. | G16H 30/20 705/3 |
| 2017/0091544 A1* | 3/2017 | Adachi ............... | G06V 30/1983 |
| 2021/0272260 A1* | 9/2021 | Ranca ..................... | G06V 10/25 |
| 2024/0045992 A1* | 2/2024 | Hossain ............... | G06V 40/174 |

FOREIGN PATENT DOCUMENTS

| | | |
|---|---|---|
| JP | 2006309622 | 11/2006 |
| JP | 2008242866 | 10/2008 |
| JP | 2009153021 | 7/2009 |
| JP | 2017069599 | 4/2017 |

OTHER PUBLICATIONS

"Office Action of Japan Counterpart Application", issued on Sep. 24, 2024, with English translation thereof, p. 1-p. 9.

* cited by examiner

*Primary Examiner* — Feng Niu
(74) *Attorney, Agent, or Firm* — JCIPRNET

(57) ABSTRACT

An information processing apparatus includes a processor configured to: classify an acquired image by using a rule in which an element of an image, which is common in each type of a form shown by the image, is defined; and perform a process of setting a region in which at least one element is displayed except for the element defined by the rule used in classification in the classified image, to be unclear, and cause a display device to display the processed image.

13 Claims, 10 Drawing Sheets

FIG. 3

| TYPE ID | TYPE NAME | CLASSIFICATION DESTINATION |
|---|---|---|
| T1 | ORDERING SHEET | /ORDERING SHEET |
| T2 | RECEIPT | /RECEIPT |
| T3 | INVOICE | /INVOICE |
| T4 | QUOTATION SHEET | /QUOTATION SHEET |
| T5 | A FORM | /A FORM |
| ... | ... | ... |
| T9 | UNCLEAR DOCUMENT | /UNCLEAR DOCUMENT |

1211

121

1212

| FORM ID | IMAGE DATA | UNCLEARNESS LEVEL |
|---|---|---|
| D1 | ... | L1 |
| D3 | ... | — |
| D5 | ... | — |
| ... | ... | ... |

FIG. 4

| USER ID | AUTHENTICATION INFORMATION | IN-CHARGE INFORMATION |
|---|---|---|
| U1 | PW1 | T1 |
| U2 | PW2 | T2 |
| U3 | PW3 | T2,T4 |
| ... | ... | ... |
| U9 | PW9 | T1-T9 |

| TYPE ID | TARGET | ELEMENT | CONDITION | | |
|---|---|---|---|---|---|
| | | | SIZE | ARRANGEMENT | CONCORDANCE RATE |
| T1 | FULL TEXT | ORDERING or ORDER | EQUAL TO OR GREATER THAN 15 pt | UPPER | 100% |
| T2 | FULL TEXT | RECEIPT | EQUAL TO OR GREATER THAN 15 pt | UPPER | 100% |
| T3 | FULL TEXT | CLAIM | EQUAL TO OR GREATER THAN 15 pt | UPPER | 100% |
| T4 | FULL TEXT | QUOTATION | EQUAL TO OR GREATER THAN 15 pt | UPPER | 100% |
| T5 | LAYOUT | (TEMPLATE A) | — | — | 95% |
| ... | ... | ... | ... | ... | ... |

| FORM ID | FORM NAME | FORM DATA | | CLASSIFICATION STATUS | |
|---|---|---|---|---|---|
| | | IMAGE | FULL TEXT | PROVISIONAL CLASSIFICATION | CONFIRMED |
| D1 | FORM #1 | ... | ... | T1 | — |
| D2 | FORM #9 | ... | ... | T2 | — |
| D3 | FORM #2 | ... | ... | — | T1 |
| D4 | FORM #8 | ... | ... | T3,T4 | — |
| ... | ... | ... | ... | ... | ... |

124

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-051349 filed Mar. 25, 2021.

BACKGROUND

(i) Technical Field

The present invention relates to an information processing apparatus and a non-transitory computer readable medium storing a program.

(ii) Related Art

There is a technology of displaying a document such as a form with being partially hidden. The technique disclosed in JP2006-309622A includes an input unit that receives an input of a document image as a process target and a mask image for hiding a partial region of the document image. The document image and the mask image are required to be associated with each other in advance and be input.

The technique disclosed in JP2009-153021A includes a scanning unit that scans image data from a mark entry form in which a blind mark is written at a position corresponding to an entry position of item information of a form. The blind mark is required to be written in the form in advance.

SUMMARY

A form image obtained by scanning a form is classified in order to distribute the form image to the person in charge, who processes the form. At this time, in a case where there is an error in the classification, the form image may be distributed to a person other than the person in charge of the form, and the confidential information written in the form may be leaked to the person other than the person in charge of the form.

Aspects of non-limiting embodiments of the present disclosure relate to an information processing apparatus and a non-transitory computer readable medium storing a program that are capable of preventing information leakage of an image of a form in a case where there is an error in the classification of the image in comparison to a case where at least a portion of the image is clearly display at a classification destination in classifying the image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: classify an acquired image by using a rule in which an element of an image, which is common in each type of a form shown by the image, is defined; and perform a process of setting a region in which at least one element is displayed except for the element defined by the rule used in classification in the classified image, to be unclear, and cause a display device to display the processed image.

BRIEF DESCRIPTION OF THE DRAWINGS

Exemplary embodiment(s) of the present invention will be described in detail based on the following figures, wherein:

FIG. 3 is a diagram illustrating an example of a type DB 121;

FIG. 4 is a diagram illustrating an example of a user DB 122;

FIG. 5 is a diagram illustrating an example of a rule DB 123;

FIG. 6 is a diagram illustrating an example of a classification status DB 124;

DETAILED DESCRIPTION

Exemplary Embodiment

Configuration of Information Processing System

Figure 1:
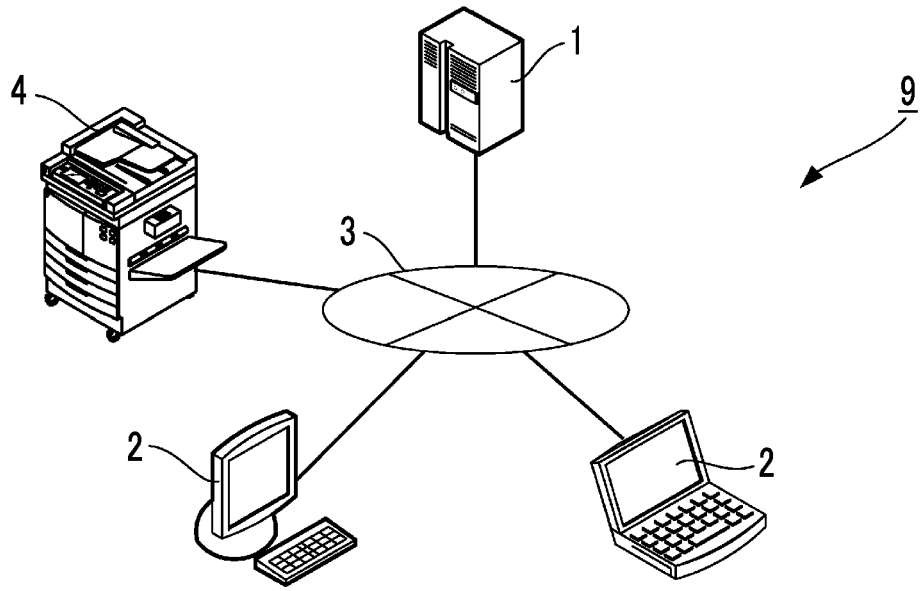
FIG. 1 is a diagram illustrating an example of an overall configuration of an information processing system 9.

FIG. 1 is a diagram illustrating an example of an overall configuration of an information processing system 9. The information processing system 9 illustrated in FIG. 1 is a system that scans a form and assigns an attribute to the form. As illustrated in FIG. 1, the information processing system 9 includes an information processing apparatus 1, a terminal 2, a communication line 3, and an image scanning device 4.

The information processing apparatus 1 is an apparatus that classifies a form for each type based on an image showing the form. The information processing apparatus 1 is, for example, a computer.

The terminal 2 is a terminal device operated by each user of the information processing system 9, and is, for example, a personal computer or the like.

The image scanning device 4 is, for example, a device that scans a document (such as a form) in which information is described on a medium such as paper, and outputs image data indicating the corresponding image.

The communication line 3 is a line for communicably connecting the information processing apparatus 1, the terminal 2, and the image scanning device 4 to each other. The communication line 3 may be, for example, a local area network (LAN), a wide area network (WAN), the Internet, or a combination thereof.

The numbers of the information processing apparatuses 1, the terminals 2, the communication lines 3, and the image scanning devices 4 in the information processing system 9 are not limited to the information processing apparatuses 1, the terminals 2, the communication lines 3, and the image scanning devices 4 in the information processing system 9 illustrated in FIG. 1. For example, the information processing apparatus 1 may be configured by a cluster system in which a plurality of devices share functions.

Configuration of Information Processing Apparatus

Figure 2:
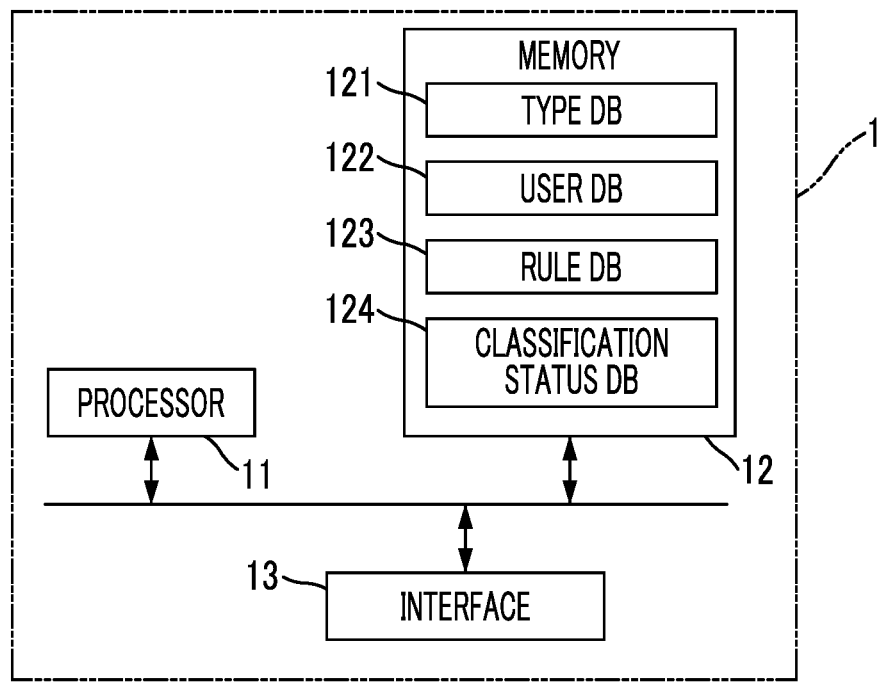
FIG. 2 is a diagram illustrating an example of a configuration of an information processing apparatus 1.

FIG. 2 is a diagram illustrating an example of a configuration of the information processing apparatus 1. The information processing apparatus 1 illustrated in FIG. 2 includes a processor 11, a memory 12, and an interface 13. That is, the information processing apparatus 1 is an example of an information processing apparatus including a memory and a processor. The components are communicably connected to each other, for example by a bus.

The processor 11 reads and executes a program stored in the memory 12, and thereby controls the units of the information processing apparatus 1. The processor 11 is, for example, a central processing unit (CPU).

The interface 13 is a communication circuit that communicably connects the information processing apparatus 1 to the terminal 2 and the image scanning device 4 via the communication line 3 in a wired or wireless manner.

The memory 12 is a storage unit that stores an operating system, various programs, data, and the like read into the processor 11. The memory 12 includes a random access memory (RAM) and a read only memory (ROM). The memory 12 may include a solid state drive, a hard disk drive, or the like. The memory 12 stores a type DB 121, a user DB 122, a rule DB 123, and a classification status DB 124.

FIG. 3 is a diagram illustrating an example of the type DB 121. The type DB 121 is a database that stores the types of forms. The type DB 121 illustrated in FIG. 3 stores image data of the form classified for each type in addition to the types of forms. The type DB 121 illustrated in FIG. 3 has a type ID list 1211 and an image data group 1212.

The type ID list 1211 stores a type ID, a type name, and a classification destination in association with each type of form. The type ID is identification information for identifying the type of form. The type name is the name of the type of form. The classification destination is identification information such as a text string, which is used for identifying a "classification destination" stored by classifying a form of the corresponding type. For example, the classification destination is a path in a file system. The classification destination may be a uniform resource identifier (URI).

The image data group 1212 illustrated in FIG. 3 is a data group associated with each of classification destinations listed in the type ID list 1211. In the image data group, a form ID, image data, and an unclearness level are stored in association with each other.

The form ID is identification information assigned to a form scanned by the image scanning device 4 in a predetermined unit, for example, one page.

The image data is image data showing an image in a case where the form identified by the corresponding form ID is displayed under the classification destination to which the image data group 1212 is linked. The image data is image data generated by a process of making image data unclear (also referred to as an unclarifying process below) in a case where the unclarifying process is performed on the image data showing the image of the form. The image of the form that has not been subjected to the unclarifying process is referred to as an "original image". The image of the form subjected to the unclarifying process is referred to as an "unclear image".

The unclearness level is information indicating the degree to which the form becomes unclear by the unclarifying process described above.

FIG. 4 is a diagram illustrating an example of the user DB 122. The user DB 122 is a database that stores a user and the type of form of which the user is in charge, in association with each other.

The user DB 122 illustrated in FIG. 4 stores a user ID, authentication information, and in-charge information in association with each other.

The user ID is identification information for identifying a user. The authentication information is information used for authenticating a user identified by the corresponding user ID. For example, the authentication information is a password known only to the user.

The in-charge information is information indicating the type of form of which the user identified by the corresponding user ID is in charge. The in-charge information illustrated in FIG. 4 is a type ID indicating the type of form of which the user is in charge. Handling the type of form means that the person has an authority to at least view this type of form and performs a work by using such a type of form. One user may be in charge of a plurality of types of forms, and a plurality of users may be in charge of one type of form.

FIG. 5 is a diagram illustrating an example of the rule DB 123. The rule DB 123 is a database that stores a rule used for classifying forms. The rule DB 123 stores elements common to images of a plurality of forms classified into a common type, for each type. The element is included in the rule described above. The rule DB 123 illustrated in FIG. 5 stores the fields of the type ID, the target, the element, and the condition in association with each other.

The type ID illustrated in FIG. 5 is identification information for identifying the type of form, and is information common to the type ID in the type DB 121.

The target illustrated in FIG. 5 is information indicating the target of the form to be inspected in a case of classifying the type of form identified by the corresponding type ID. For example, the "full text" is all text strings (simply referred to as the full text below) obtained by performing optical text recognition on an image showing the entire form of the type. The "layout" is the arrangement itself of each element such as a ruled line, a border, an imprint, and a text string, which are included in the type of form.

The element illustrated in FIG. 5 is information indicating the element to be compared with the above-described target in a case of classifying the type of form identified by the corresponding type IDs. The condition illustrated in FIG. 5 is information indicating the condition for comparing the above-described target and the element to each other.

For example, regarding a form of the type identified by the type ID "T2" in the rule DB 123 illustrated in FIG. 5, a text string that refers to "receipt" as an element, and satisfies conditions in which the size is "equal to or greater than 15 pt", the arrangement is "upper", and the concordance rate is "100%" is searched from the full text. In a case where such a text string is found in the full text of the form, the form is classified into the type identified by the type ID "T2".

The above-described element may be defined as one of two or more text strings. For example, regarding a form of the type identified by the type ID "T1" in the rule DB 123 illustrated in FIG. 5, "ordering or order" is described as the element. In this case, the information processing apparatus 1 searches the full text of the form for a text string that is either a text string "ordering" or a text string "order" and satisfies the corresponding condition. In a case where either text string is found in the full text of the form, the form is classified into the type identified by the type ID "T1".

In a case where the target is the full text, the element to be compared is a text string. In a case where the target is a layout, the element may be a template or a template image prepared in advance. For example, regarding a form of the type identified by the type ID "T5" in the rule DB 123 illustrated in FIG. 5, the layout of the form is compared with the template image identified by the template A. In a case where the concordance rate of items such as the thickness and the length of a ruled line, the arrangement, and the number of lines is equal to or greater than 95%, the form is classified into the type identified by the type ID "T5".

FIG. 6 is a diagram illustrating an example of the classification status DB 124. The classification status DB 124 is a database that stores a status in which the form is classified for each scanned form. The classification status DB 124 illustrated in FIG. 6 stores fields of a form ID, a form name, form data, and the classification status in association with each other.

The form ID illustrated in FIG. 6 is identification information assigned to the form, and is information common to the form ID in the type DB 121. The form name is a text string indicating the name of the form identified by the corresponding form ID.

The form data illustrated in FIG. 6 is a set of image data showing an image at the time of scanning a form identified by the corresponding form ID and a full text extracted from the image data.

The classification status illustrated in FIG. 6 is information indicating a status in which the form identified by the corresponding form ID is classified.

For example, in the classification status DB 124 illustrated in FIG. 6, the form name of the form identified by the form ID "D1" is "form #1". The form is provisionally classified into the type identified by the type ID "T1".

Here, the "provisional classification" means that the information processing apparatus 1 provisionally classifies the image of the form by using the rule DB 123, for each type. For example, the provisional classification is a classification before the classification is confirmed. The information processing apparatus 1 may request the approval of the user in a case of confirming the classifications of all forms. The information processing apparatus 1 may confirm whether the classification is confirmed, or the image is provisionally classified, in accordance with the degree (also referred to as classification certainty) of certainty of the classification using the rule DB 123. The classification certainty is defined by, for example, whether or not the concordance rate is greater than a threshold value, whether the classification type is narrowed down to one, and the like.

Configuration of Terminal

Figure 7:
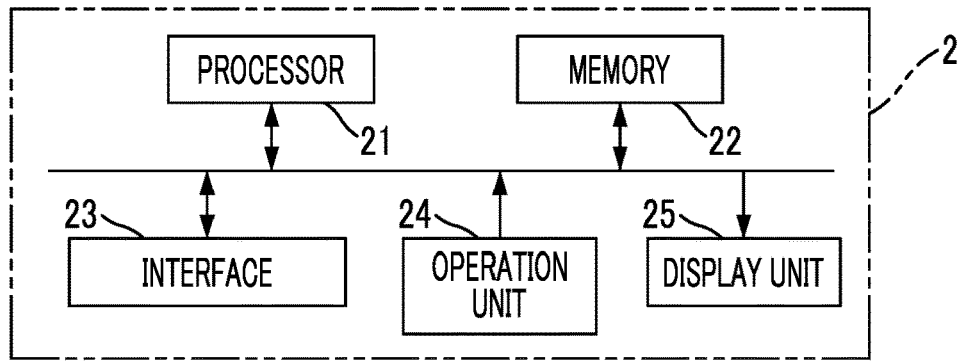
FIG. 7 is a diagram illustrating an example of a configuration of a terminal 2.

FIG. 7 is a diagram illustrating an example of a configuration of the terminal 2. The terminal 2 illustrated in FIG. 7 includes a processor 21, a memory 22, an interface 23, an operation unit 24, and a display unit 25. The components are communicably connected to each other, for example by a bus.

The processor 21 reads and executes a program stored in the memory 22, and thereby controls the units of the terminal 2. The processor 21 is, for example, a CPU.

The memory 22 is a storage unit that stores an operating system, various programs, data, and the like read into the processor 21. The memory 22 includes a RAM and a ROM. The memory 22 may include a solid state drive, a hard disk drive, or the like.

The interface 23 is a communication circuit that communicably connects the information processing apparatus 1 and the image scanning device 4 with the terminal 2 via the communication line 3 in a wired or wireless manner.

The operation unit 24 includes an operation tool for issuing various instructions, such as operation buttons, a keyboard, a touch panel, and a mouse. The operation unit receives an operation and transmits a signal corresponding to the operation content to the processor 21.

The display unit 25 has a display screen such as a liquid crystal display, and displays an image under the control of the processor 21. A transparent touch panel of the operation unit 24 may be superposed on the display screen.

The terminal 2 displays the image of the form under the control of the information processing apparatus 1. Therefore, the terminal 2 is an example of a display device that displays an image of a form under the control of the information processing apparatus 1.

Configuration of Image Scanning Device

Figure 8:
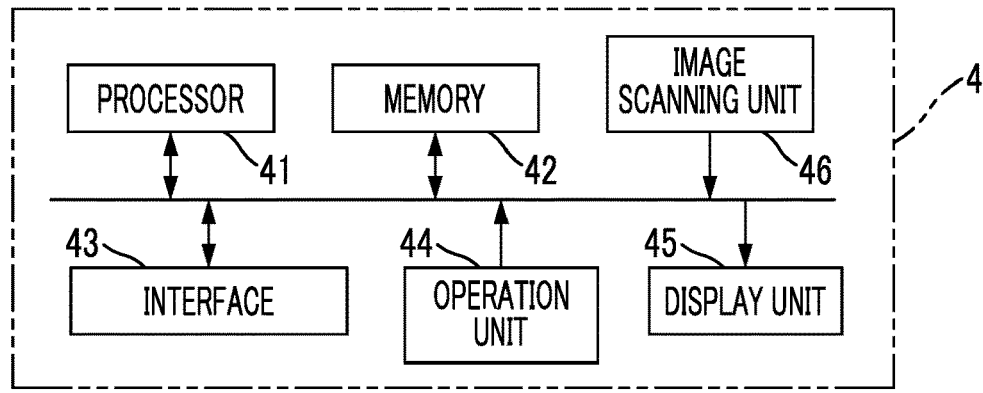
FIG. 8 is a diagram illustrating an example of a configuration of an image scanning device 4.

FIG. 8 is a diagram illustrating an example of a configuration of the image scanning device 4. The image scanning device 4 illustrated in FIG. 8 includes a processor 41, a memory 42, an interface 43, an operation unit 44, a display unit 45, and an image scanning unit 46. The components are communicably connected to each other, for example by a bus.

The processor 41 reads and executes a program stored in the memory 42, and thereby controls the units of the image scanning device 4. The processor 41 is, for example, a CPU.

The memory 42 is a storage unit that stores an operating system, various programs, data, and the like read into the processor 41. The memory 42 includes a RAM and a ROM. The memory 42 may include a solid state drive, a hard disk drive, or the like.

The interface 43 is a communication circuit that communicably connects the information processing apparatus 1 and the terminal 2 with the image scanning device 4 via the communication line 3 in a wired or wireless manner.

The operation unit 44 includes an operation tool for issuing various instructions, such as operation buttons and a touch panel. The operation unit receives an operation and transmits a signal corresponding to the operation content to the processor 41.

The display unit 45 has a display screen such as a liquid crystal display, and displays an image under the control of the processor 41. A transparent touch panel of the operation unit 44 may be superposed on the display screen.

The image scanning unit 46 includes platen glass, an irradiation device that irradiates a medium with light, an optical system that collects reflected light, an image sensor device such as a complementary metal oxide semiconductor (CMOS) image sensor or a charge coupled device (CCD) image sensor, and the like. The image scanning unit 16 scans an image formed on a form placed on platen glass, generates image data indicating the scanned image, and supplies the generated image data to the processor 41, under control of the processor 41. The form is an object that transfers information by forming text and the like on a medium such as paper. The image scanning unit 46 may include an automatic document feeder (ADF) that transports a form page by page.

Functional Configuration of Information Processing Apparatus

Figure 9:
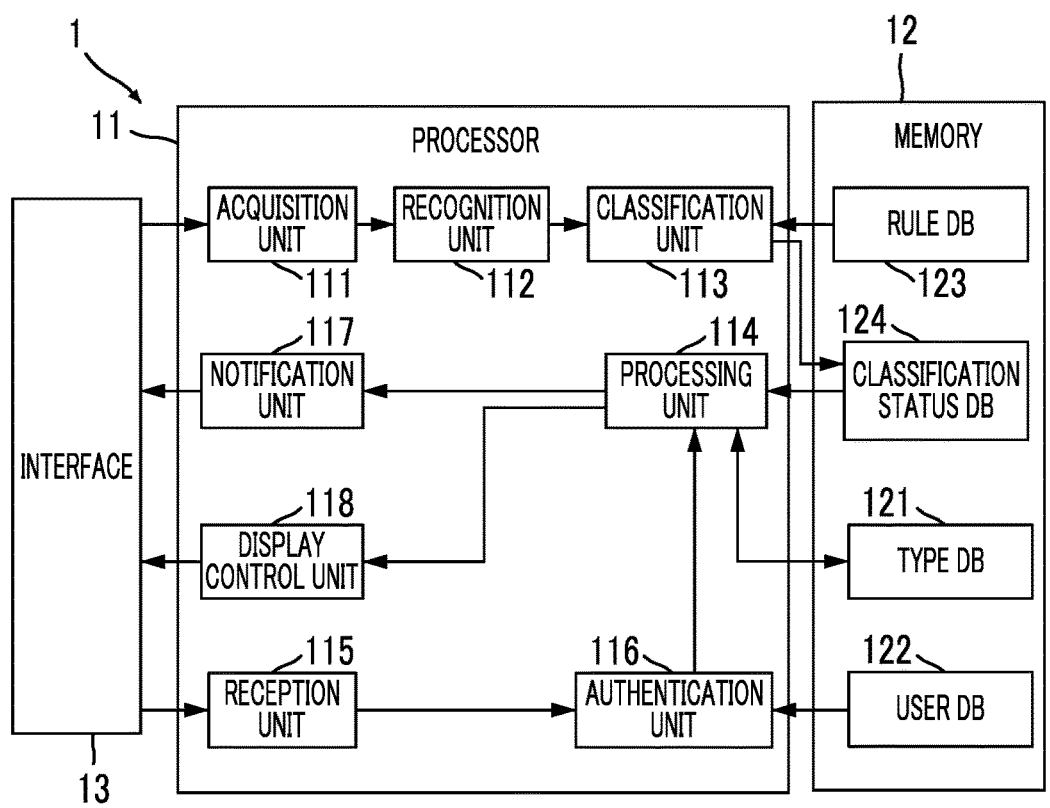
FIG. 9 is a diagram illustrating an example of a functional configuration of the information processing apparatus 1.

FIG. 9 is a diagram illustrating an example of a functional configuration of the information processing apparatus 1. The processor 11 of the information processing apparatus 1 executes a program stored in the memory 12 to function as an acquisition unit 111, a recognition unit 112, a classification unit 113, a processing unit 114, a reception unit 115, an authentication unit 116, a notification unit 117, and a display control unit 118.

The acquisition unit 111 acquires image data indicating an image of a form scanned by the image scanning device 4, and the name of the form designated by the user, that is, the form name.

The recognition unit 112 performs an optical text recognition process on the image data acquired by the acquisition unit 111 to recognize the text described in the form and generate the above-described full text.

The classification unit 113 classifies the acquired image by using the rule DB 123. As described above, the rule DB 123 stores a rule including an element common to images of a plurality of forms classified into a common type, for each type.

That is, the processor 11 functioning as the classification unit 113 is an example of a processor that classifies the acquired image by using a rule in which the element of the image common to each type of form shown by the image is defined.

In a case where a plurality of candidates for the classification destination are provided for the image of the form, the classification unit 13 illustrated in FIG. 9 classifies the image into the candidates. That is, the processor 11 functioning as the classification unit 113 is an example of a processor that classifies the acquired image into a plurality of types in a case where a plurality of candidates for the classification destination of the acquired image of the form are provided.

Each time the classification unit 113 illustrated in FIG. 9 classifies the forms, the classification unit stores information of the status in which the forms are classified, in the classification status DB 124.

With reference to the classification status DB 124, the processing unit 114 performs the unclarifying process on a region in which at least one element other than the element defined by the rule used in the classification is displayed, among regions forming the image classified by the classification unit 113.

That is, the processor 11 functioning as the processing unit 114 is an example of a processor that performs a process of setting a region in which at least one element is displayed in the image of the classified form, excluding the element defined by the rule used in the classification, to be unclear.

The processing unit 114 illustrated in FIG. 9 reads the image data of the form, which indicates that the form is provisionally classified into any type, in the classification status DB 124. Then, the processing unit excludes the element which is stored in the rule DB 123 and is used in a case of being classified into the type, and specifies a region in which at least one element is displayed.

The processing unit 114 performs the unclarifying process of setting the content described in the specified region to be unclear, on the specified region. The unclarifying process may be, for example, a process called Gaussian blur. The unclarifying process may be a process of calculating a logical sum, an exclusive OR, or the like of the image in the above-described region and a predetermined mask pattern, and overwriting the region with the calculation result. In this case, the predetermined mask pattern may be, for example, shaded or filled. The unclarifying process may be an averaging filter that averages pixel values for each pixel group having a predetermined size.

The processing unit 114 stores the image data generated by the unclarifying process in the image data group 1212 of the type DB 121, and sets the corresponding unclearness level.

The reception unit 115 receives a set of a user ID for identifying a user and authentication information of the user via the terminal 2. The authentication unit 116 collates the received set of the user ID and the authentication information with the stored contents of the user DB 122, and attempts to authenticate the user identified by the user ID. In a case where the attempt to authenticate the user succeeds, the authentication unit 116 transmits, to the processing unit 114, a message indicating that the attempt to authenticate the user succeeds.

The reception unit 115 receives, from the terminal 2, an instruction of the user regarding the classification of the image of the form. For example, in a case where the image of the form is classified into any type, the reception unit 115 receives an instruction indicating whether or not the user approves that the image of the form is classified into the type, from the user in charge of the type.

In a case where the image of the form is classified into a certain type, the user in charge of the type sees the unclear image of the form, determines whether or not the classification is correct, and issues an instruction indicating whether or not the classification is approved, to the information processing apparatus 1 via the terminal 2.

In a case where the reception unit 115 receives, from the user, an instruction indicating that the classification of the image of the form is approved, the classification unit 113 updates the classification status DB 124 and confirms the classification.

In a case where the reception unit 115 receives, from the user, an instruction indicating that the classification of the image of the form is not approved, the classification unit 113 updates the classification status DB 124 and cancels the classification. That is, the processor 11 functioning as the classification unit 113 is an example of a processor that cancels the classification of the image into one type in a case where an instruction indicating that the classification of the image of the form into the one type is not approved is received. In a case where the classification unit 113 updates the classification status DB 124 and cancels the above-described classification, the processing unit 114 updates the type DB 121 in accordance with the content of the update. As a result, the above-described form is not recognized at the classification destination related to the canceled classification.

In a case where the image of the form is classified into a plurality of types, the reception unit 115 receives, from the user, an instruction indicating whether or not the user approves the classification of the image of the form for each of the plurality of types. Here, in a case where the reception unit 115 receives an instruction indicating that the classification of the image into any one of the plurality of types is approved, the classification unit 113 confirms the classification of the image into the "one type" and cancels the classification of the image into other types.

That is, the processor 11 functioning as the reception unit 115 and the classification unit 113 is an example of a processor that, in a case where the image of the form is classified into a plurality of types, receives, from the user, an instruction indicating that the user approves the classification of the image for each of the plurality of types, and, in a case where an instruction indicating that the classification of the image into any one of the plurality of types is approved is received, cancels the classification of the image into other types.

For example, the reception unit 115 receives an instruction to cancel at least a portion of the unclarifying process on the above-described region.

The reception unit 115 may receive the cancellation instruction only from the authenticated user and not from the unauthenticated user. The processor 11 functioning as the reception unit 115 is an example of a processor that receives an instruction to cancel the process of setting the region to be unclear in a case where the user is authenticated. The reception unit 115 may determine whether or not to receive, from the user, the above-described instruction to cancel the unclarifying process, for each form. In this case, the reception unit 115 may determine the necessity of the user authentication, for example, in accordance with the status of the provisional classification of each form. In a case where the form is classified into a highly confidential type, the reception unit 115 may request user authentication.

In a case where the reception unit 115 receives an instruction to cancel at least a portion of the unclarifying process on the above-described region, the processing unit 114 may cancel the unclarifying process in response to the instruction. The processor 11 functioning as the reception unit 115 and the processing unit 114 is an example of a processor that excludes the element defined by the rule used in the classification from the image of the classified form, receives, from the user, an instruction to cancel the process of setting the element described in the region to be unclear, which has been performed on a region in which at least one element is displayed, and, in a case where the instruction is received from the user, cancels the process.

The notification unit 117 transmits various notifications to a predetermined notification destination or user in accordance with the classification by the classification unit 113 or the process by the processing unit 114.

In a case where the processing unit 114 cancels the unclarifying process in response to the instruction of the user, the notification unit 117 may notify the predetermined notification destination that the unclarifying process has been canceled. Thus, for example, the administrator or the like of the information processing system 9 knows that the unclarifying process has been canceled by an mail or the like transmitted from the information processing apparatus 1. That is, the processor 11 functioning as the notification unit 117 is an example of a processor that notifies a predetermined notification destination that the process has been canceled, in a case where the process of setting the region to be unclear is canceled.

The notification unit 117 may not perform the notification in a case where the unclarifying process on a partial region of the image is canceled, and may perform the notification in a case where the unclarifying process on the entire region of the image is canceled. This may be reversely performed.

In a case where the image of the form is classified into a plurality of types, the notification unit 117 may notify the user of information regarding the classification of the image in a manner different from the manner in a case where the image of the form is classified into one type. In a case where the image of the form is classified into a plurality of types, for example, the notification unit 117 notifies a user who is the person in charge of one type among the plurality of types and checks the image of the form, that the image of the form is also classified into other types. Such a notification is performed, for example, by displaying the above message on the terminal 2.

In this case, the processor 11 functioning as the notification unit 117 is an example of a processor that, in a case where the image is classified into a plurality of types, notifies the user of information regarding the classification of the image in a form different from the form in a case where the image is classified into one type.

For example, in a case where the image of the form is classified into a plurality of types and the classification of the image into the plurality of types is not approved at all by the user, the notification unit 117 may notify the predetermined notification destination such as the administrator of the information processing system 9 that the type of the image is unclear. At this time, the classification unit 113 may cancel the above-described classification of the image of the form into all the above-described plurality of types.

In this case, the processor 11 functioning as the notification unit 117 and the classification unit 113 is an example of a processor that, in a case where an instruction indicating that the classification of the image of the form into a plurality of types is not approved at all, cancels the classification of the image of the form into the plurality of types and notifies the predetermined notification destination that the type of the image is unclear.

The display control unit 118 causes the terminal 2 to display an image in accordance with the process by the processing unit 114. For example, the display control unit 118 causes the terminal 2 being a display device to display an unclear image generated by the processing unit 114. The user sees the unclear image and determines whether or not the form shown by the unclear image is classified into the type of which the user is in charge. In the unclear image, a region excluding the element used in the classification is unclear. Thus, the user does not recognize the contents described in the region. In addition, since the element used in the classification is not unclear in the unclear image, the user can recognize the element.

Operation of Information Processing Apparatus Classification Operation

Figure 10:
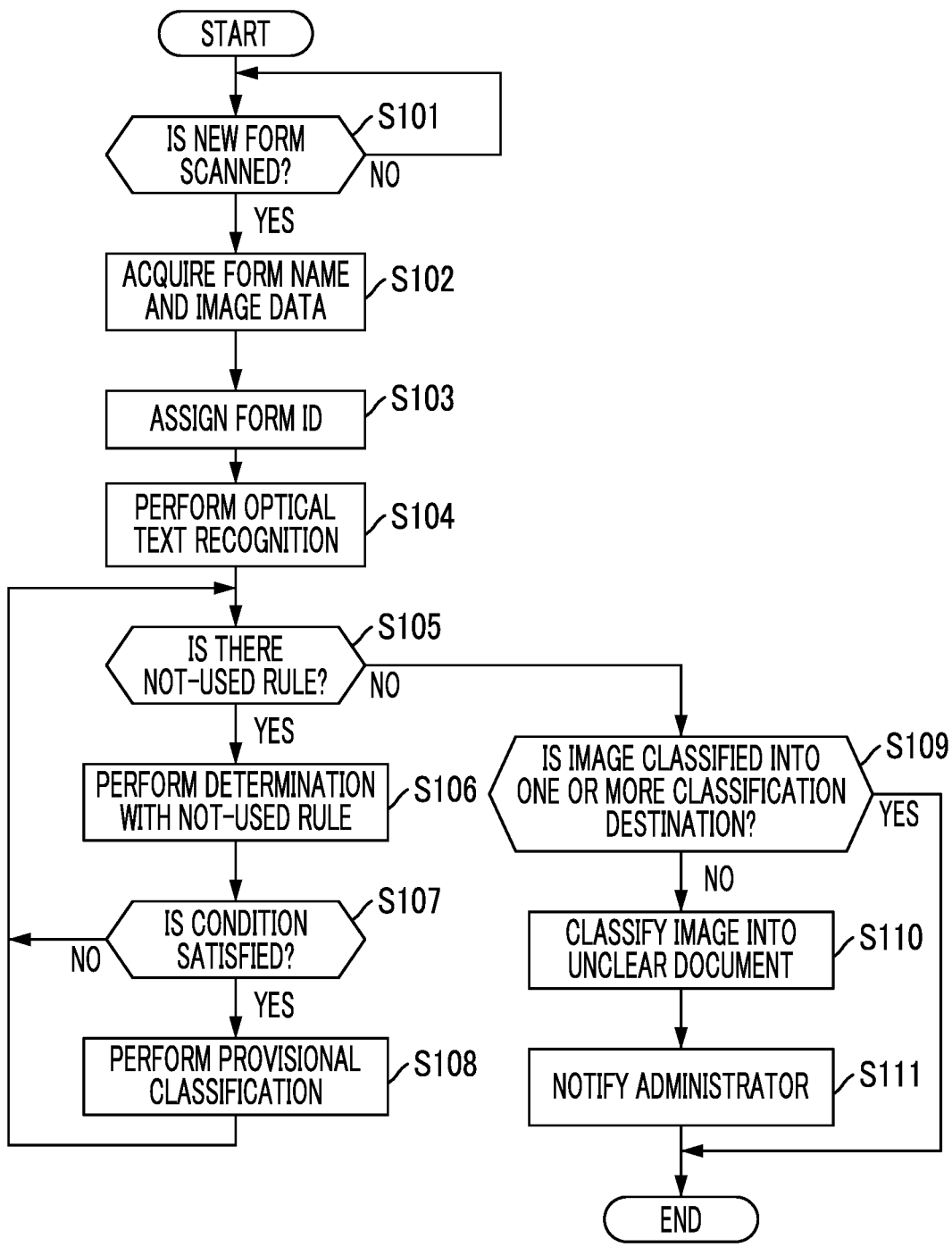
FIG. 10 is a flowchart illustrating an example of a flow of a classification operation by the information processing apparatus 1.

FIG. 10 is a flowchart illustrating an example of a flow of a classification operation by the information processing apparatus 1. The processor 11 of the information processing apparatus 1 monitors the image scanning device 4 via the communication line 3 and the interface 13, and determines whether or not the image scanning device 4 scans a new form (Step S101). While determining that no new form has been scanned (Step S101; NO), the processor 11 continues this determination.

In a case where it is determined that the new form has been scanned (Step S101; YES), the processor 11 acquires the form name indicating the form read from the image scanning device 4 and the image data indicating the image of the form (Step S102).

The processor 11 assigns a form ID to a set of the acquired form name and image data (Step S103). The processor 11 performs optical text recognition on the acquired image data to generate a text string written in the form, that is, the above-described full text (Step S104). The processor 11 stores the assigned form ID, the acquired form name, the image data, and the generated full text in the classification status DB 124 in association with each other.

Then, the processor 11 refers to the rule DB 123 and classifies the above-described image of the form by using each rule. Firstly, the processor 11 determines whether or not there is a not-used rule in the rule DB 123 (Step S105).

In a case where it is determined that there is a not-used rule (Step S105; YES), the processor 11 determines the image of the form described above with the not-used rule (Step S106).

As a result of the determination in Step S106, the processor 11 determines whether or not the image of the form satisfies the condition defined in the above-described rule (Step S107). In a case where it is determined that the image of the form does not satisfy the condition (Step S107; NO), the processor 11 causes the process to return to Step S105.

In a case where it is determined that the image of the form satisfies the condition (Step S107; YES), the processor 11 provisionally classifies the image into the type associated with the condition (Step S108), and then causes the process to return to Step S105.

In Step S108, the processor 11 may classify the image into the above-described type in accordance with the degree to which the image of the form satisfies the condition, which is determined in Step S107. For example, in a case where the image of the form is greater than a threshold value for which the certainty of being classified into the corresponding type by the above rule, the processor 11 may not provisionally classify the image into the type, but confirm the classification. In this case, the processor 11 does not need to require the approval of the above-described classification to the user, and the user views the original image of the form that has not been subjected to the unclarifying process.

In Step S105 illustrated in FIG. 10, in a case where it is determined that there is no not-used rule (Step S105; NO), the processor 11 determines whether or not the above-described image of the form is classified into one or more classification destinations, by the processes of Steps 105 to S108 (Step S109).

In a case where it is determined that the image of the form is not classified into one or more classification destinations, that is, the image of the form is not classified into any type (Step S109; NO), the processor 11 classifies the above-described image of the form into an unclear document (Step S110). Then, the processor notifies the administrator that the image of the form is classified into the unclear document, by an e-mail, a short message service, or the like (Step S111).

In a case where it is determined that the image of the form is classified into one or more classification destinations (Step S109; YES), the processor 11 ends the process without performing the processes of Steps S110 and S111.

With the above operation, the image of the form scanned by the image scanning device 4 is classified into the unclear document in a case where the type of the form is unclear, and is classified into one or more types in a case where there are one or more candidates for the types.

Display Operation

Figure 11:
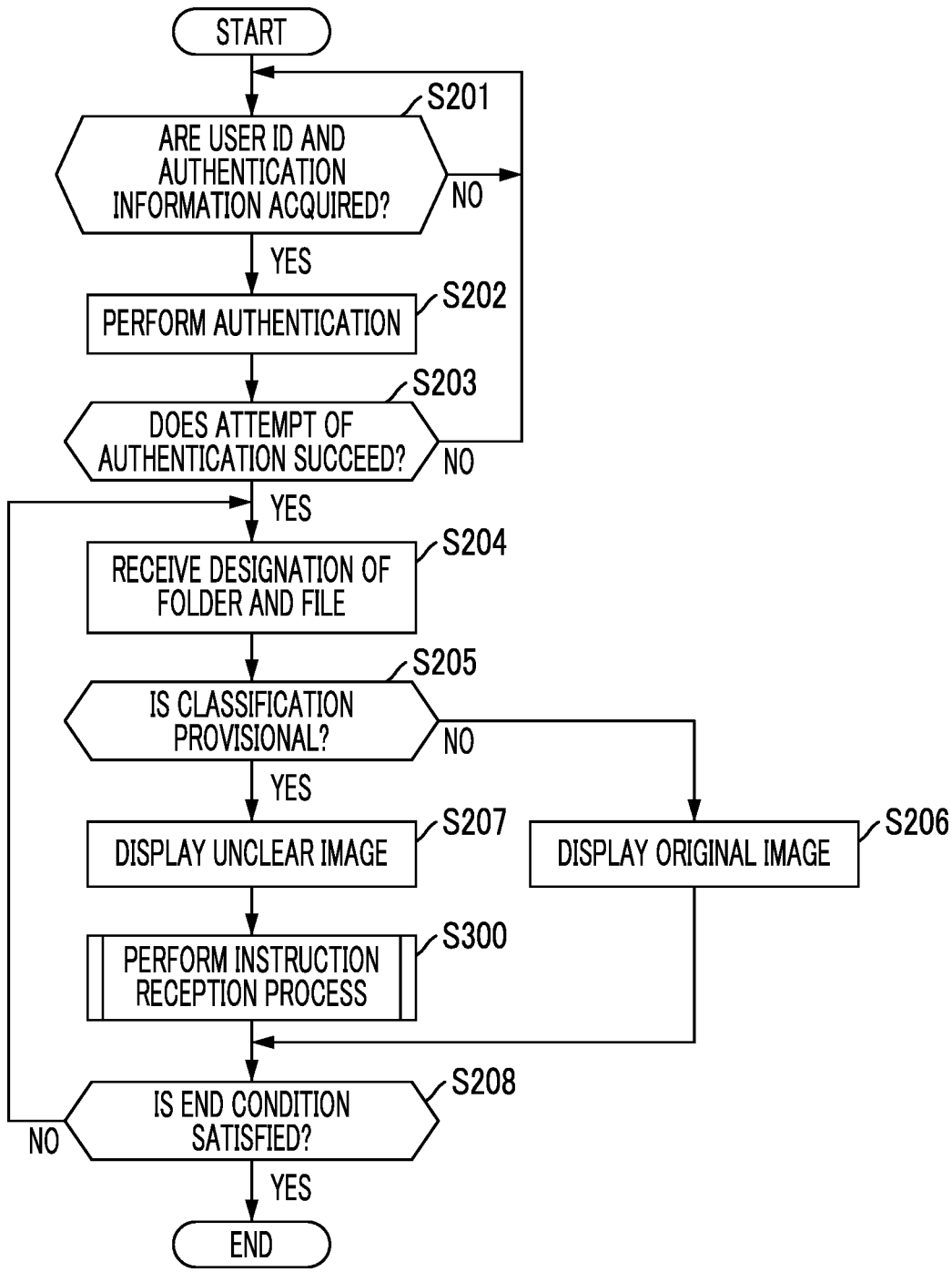
FIG. 11 is a flowchart illustrating an example of a flow of a display operation by the information processing apparatus 1.

FIG. 11 is a flowchart illustrating an example of a flow of a display operation by the information processing apparatus 1. The processor 11 of the information processing apparatus 1 determines whether or not to acquire a user ID for identifying the user and authentication information, which are input to the terminal 2 by the user (Step S201). The processor 11 continues the determination while determining that the user ID and the authentication information have not been acquired (Step S201; NO).

In a case where it is determined that the user ID and the authentication information have been acquired (Step S201; YES), the processor 11 collates the set of the acquired user ID and authentication information with the stored contents of the user DB 122, and attempts to authenticate the user identified by the user ID (Step S202). The processor 11 determines whether or not the attempt to authenticate the user succeeds (Step S203).

In a case where it is determined that the attempt to authenticate the user does not succeed (Step S203; NO), the processor 11 causes the process to return to Step S201.

In a case where it is determined that the attempt to authenticate the user succeeds (Step S203; YES), the processor 11 receives, from the terminal 2, designation of a folder and a file by the user (Step S204).

Figure 12:
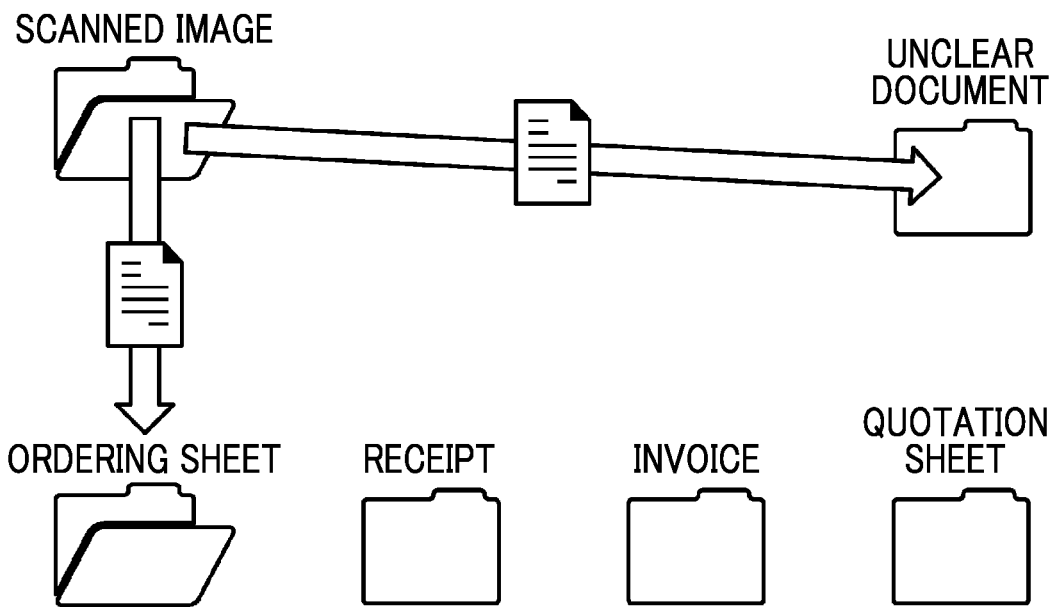
FIG. 12 is a diagram illustrating a classification destination of an image.

FIG. 12 is a diagram illustrating the classification destination of the image. With the operation illustrated in FIG. 10, the image (also referred to as a scanned image) scanned by the image scanning device 4 is stored in a folder corresponding to the type of form or a folder indicating an unclear document. In a case where the authenticated user designates a folder of the type of which the authenticated user is in charge, the processor 11 of the information processing apparatus 1 functions as a file manager and causes the terminal 2 to display a list of the image of the form, which is stored in the designated folder.

Figure 13:
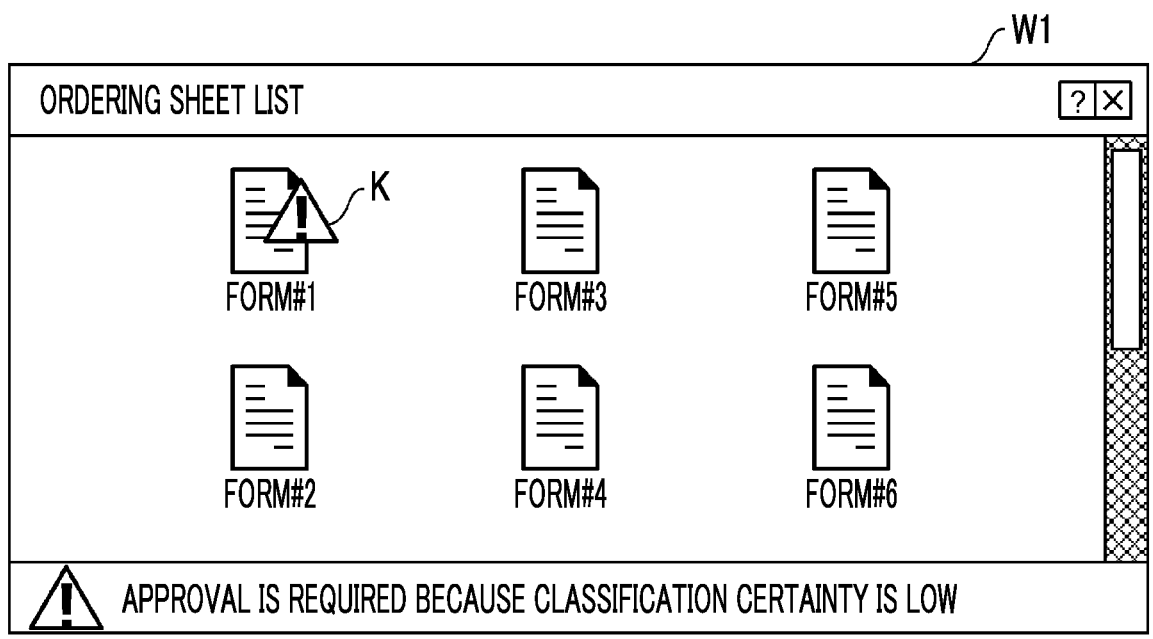
FIG. 13 is a diagram illustrating an example of a list of files stored in a folder.

FIG. 13 is a diagram illustrating an example of a list of files stored in a folder. For example, the user DB 122 illustrated in FIG. 4 indicates that the user having the user ID "U1" is in charge of the type of the type ID "T1". The type DB 121 illustrated in FIG. 3 indicates that the type name of the form corresponding to the type ID "T1" is "ordering sheet", and the classification destination is "/ordering sheet".

The user having the user ID "U1" is authenticated by inputting the user ID "U1" together with the authentication information "PW1". In a case where the user designates the classification destination "/ordering sheet" as the identification information indicating a folder as the classification destination, the information processing apparatus 1 causes the terminal 2 to display a window W1 illustrated in FIG. 13.

The window W1 illustrated in FIG. 13 displays icons indicating files stored in the classification destination "/ordering sheet". As illustrated in FIG. 13, the file of the form called by the form name "form #1" is different from the file of the form called by the form name "form #3" or the form name "form #5", and a mark K is superimposed on the icon. The mark K is a mark indicating that the approval of the user is required because the classification certainty is low. That is, the file indicated by the icon with the mark K means a file showing the image of the form which is provisionally classified.

As illustrated in FIG. 11, the processor 11 determines whether or not the file designated by the user is a file showing the image of the form that is provisionally classified (Step S205).

In a case where it is determined that the file designated by the user is not the file showing the image of the form that is provisionally classified (Step S205; NO), the classification of the file is confirmed. Thus, the processor 11 displays the original image showing the form (Step S206), and causes the process to proceed to Step S208.

In a case where it is determined that the file designated by the user is the file showing the image of the form that is provisionally classified (Step S205; YES), the processor 11 displays an unclear image showing the form (Step S207).

In a case where the processor 11 of the information processing apparatus 1 executes Step S207 for the first time, the processor 11 may perform the unclarifying process on the original image of the form to generate an unclear image. In this case, the generated unclear image may be stored in the image data group 1212 of the type DB 121 in association with the unclearness level.

In a case where the unclear image is already stored in the image data group 1212 of the type DB 121, the processor 11 may read the unclear image and cause the terminal 2 to display the unclear image, without performing the unclarifying process. In Step S108, the processor 11 may perform the unclarifying process on the original image of the form to generate an unclear image and store the unclear image in the image data group 1212 of the type DB 121.

After displaying the unclear image showing the form, the processor 11 causes the process to proceed to Step S300 and performs a process (referred to as an instruction reception process) of receiving an instruction from the user (Step S300).

The processor 11 determines whether or not the condition (also referred to as the end condition) for ending the process for the designated folder and file is satisfied (Step S208). The end condition is, for example, a condition that the end instruction is issued by the user.

In a case where it is determined that the end condition is not satisfied (Step S208; NO), the processor 11 causes the process to return to Step S204. In a case where it is determined that the end condition is satisfied (Step S208; YES), the processor 11 ends the process.

Reception Operation

Figure 14:
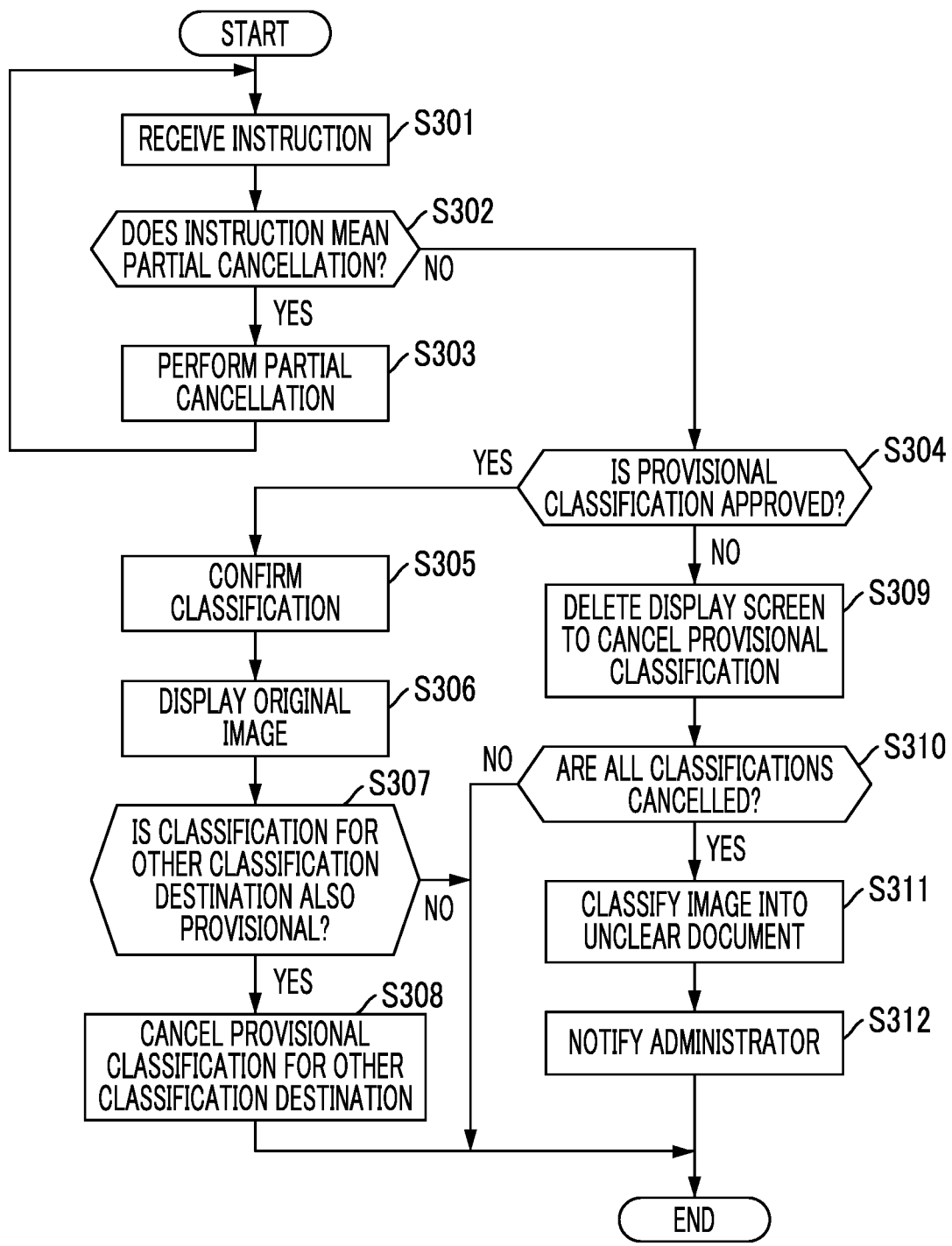
FIG. 14 is a flowchart illustrating an example of a flow of a reception operation by the information processing apparatus 1.

FIG. 14 is a flowchart illustrating an example of a flow of a reception operation by the information processing apparatus 1. With Step S207 in FIG. 11 described above, the unclear image is displayed on the display unit 25 of the terminal 2.

Figure 15:
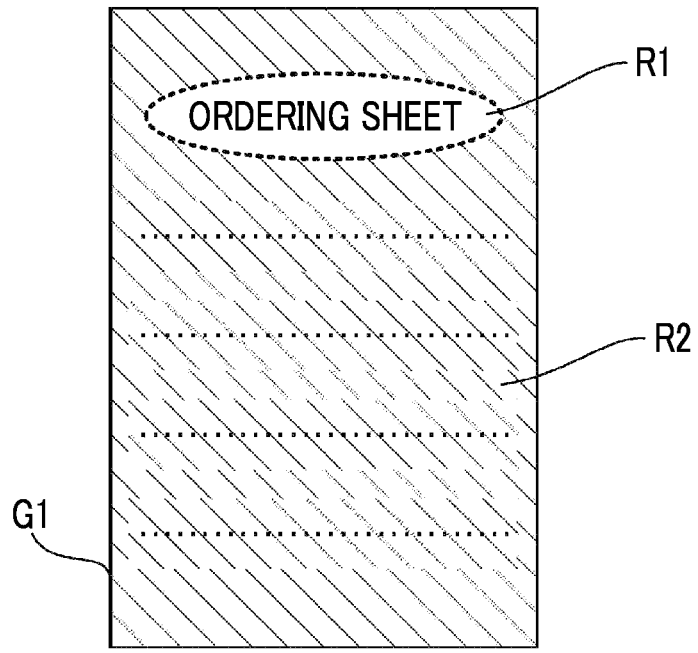
FIG. 15 is a diagram illustrating an example of an unclear image G1.

FIG. 15 is a diagram illustrating an example of an unclear image G1. The unclear image G1 illustrated in FIG. 15 is classified into the types of forms called by the type name "ordering sheet". According to the type DB 121 illustrated in FIG. 3, the type ID for identifying the type of the form is "T1". As shown in the rule DB 123 illustrated in FIG. 5, the element "ordering or order" is associated with the type ID "T1".

Therefore, the processor 11 of the information processing apparatus 1 searches for the text string of "ordering" or "order" satisfying the condition such as the size, the arrangement, and the concordance rate, from the full text generated by performing optical text recognition on the original image of the form. Then, in a case where the text string is found, the processor 11 provisionally classifies the image of the form into the type identified by the type ID "T1".

For example, in a case where the processor 11 provisionally classifies the image of the form identified by the form ID "D1" into the type identified by the type ID "T1", the processor 11 writes the type ID "T1" in the field of the provisional classification among fields of the classification status corresponding to the form. ID "D1" in the classification status DB 124. Then, the processor 11 performs the unclarifying process on the image data indicating the original image stored in the field of the image of the form data associated with the form ID "D1" in the classification status DB 124. Then, the processor 11 stores the unclear image obtained by the generation, in the type DB 121.

The unclear image G1 illustrated in FIG. 15 is an image obtained by performing the process of setting the region in which at least one element is displayed excluding the element "ordering or order" used in the classification, to be unclear. Therefore, the region R1 displayed as "ordering sheet" including the text string of "ordering" is not the target of the unclarifying process, and the region R2 other than the region R1 is the target of the unclarifying process.

Therefore, the user in charge of the type called by the type name "ordering sheet" checks the text of "ordering" being the element common to this type of form, and determines whether or not this classification is correct. The user user checks the unclear image G1 obtained by unclarifying the region R2 in which an element which is not common to this type of form is displayed. Thus, the confidential items included in the region R2 are not seen at the stage of the provisional classification. Therefore, even though the provisional classification is incorrect, the user can determine the propriety of the provisional classification without seeing the detailed contents of the form which is to be classified into the type of which the user is not in charge.

As illustrated in FIG. 14, the processor 11 of the information processing apparatus 1 receives an instruction regarding the propriety of the provisional classification from the user (Step S301). At this time, in addition to the unclear image G1 illustrated in FIG. 15, the processor 11 displays, for example, a dialog box for receiving the instruction of the user.

Figure 16:
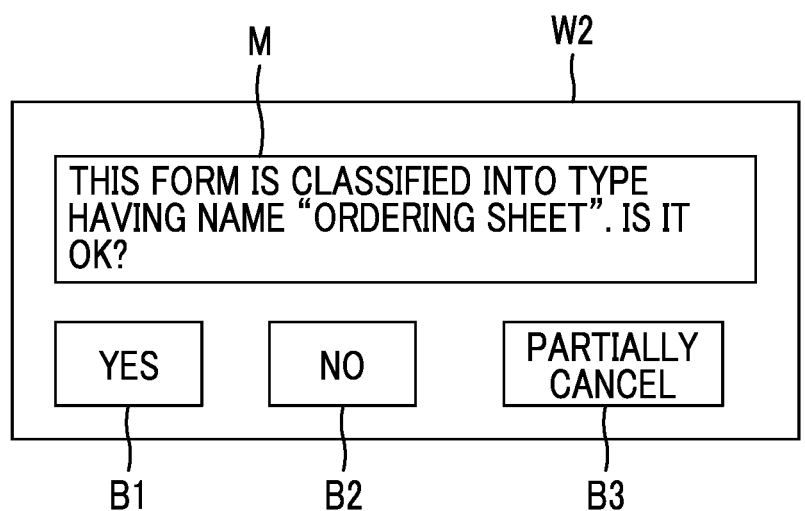
FIG. 16 is a diagram illustrating an example of a dialog box W2 displayed for a user.

FIG. 16 is a diagram illustrating an example of a dialog box W2 displayed for the user. In the dialog box W2 illustrated in FIG. 16, buttons B1 to B3 are displayed together with a message M indicating that "This form is classified into the type named "ordering sheet". Is it OK?".

The button B1 illustrated in FIG. 16 is a button on which the text string "Yes" is displayed. In a case where the button B1 is pressed by the user, the terminal 2 transmits an instruction indicating that the above-described classification is approved, to the information processing apparatus 1.

The button B2 illustrated in FIG. 16 is a button on which the text string "No" is displayed. In a case where the button B2 is pressed by the user, the terminal 2 transmits an instruction indicating that the above-described classification is not approved, to the information processing apparatus 1.

The button B3 illustrated in FIG. 16 is a button on which the text string "partially cancel" is displayed. In a case where the button B3 is pressed by the user, the terminal 2 transmits, to the information processing apparatus 1, an instruction (also referred to as a partial cancellation instruction) to cancel the unclarifying process on at least a portion of the region R2 subjected to the unclarifying process.

The processor 11 of the information processing apparatus 1 determines whether or not the instruction received in Step S301 illustrated in FIG. 14 is the above-described partial cancellation instruction (Step S302). In a case where it is determined that the received instruction is the partial cancellation instruction (Step S302; YES), the processor 11 cancels the unclarifying process on at least a portion of the region subjected to the unclarifying process (S303), and causes the process to return to Step S301.

Figure 17A:
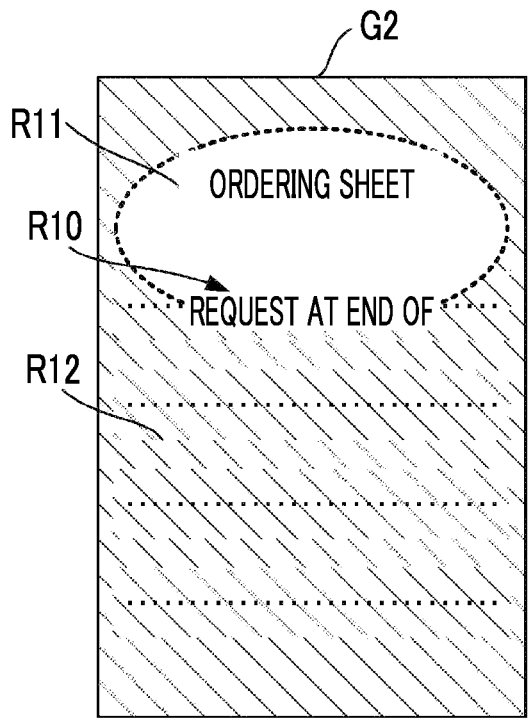
FIGS. 17A and 17B are diagrams illustrating an example of an unclear image G2 and an original image G0.
Figure 17B:
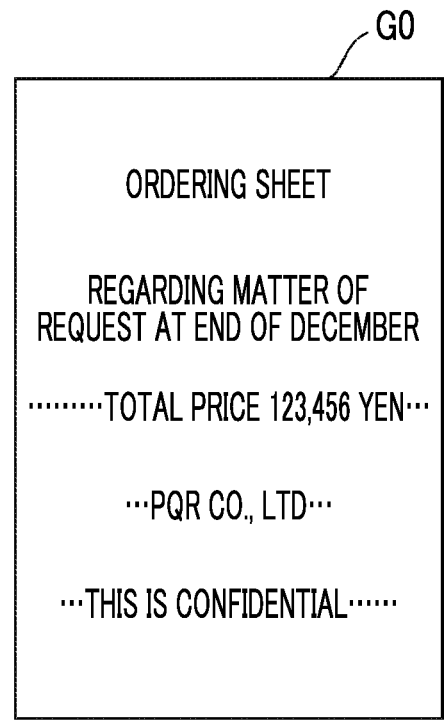

FIGS. 17A and 17B are diagrams illustrating an example of the unclear image G2 and the original image G0. By performing the above-described partial cancellation, the unclear image G1 illustrated in FIG. 15 changes to the unclear image G2 illustrated in FIG. 17A. In the unclear image G2, a region R11 which is not unclarified is enlarged in comparison to the region R1 illustrated in FIG. 15. A region R12 which is not unclarified is smaller than the region R2 illustrated in FIG. 15. Therefore, a region R10 that has not been checked by the user in the unclear image G1 is included in the region R11 and becomes clear. The user can determine, for example, whether or not the provisional classification is correct in consideration of the contents of the region R10.

In a case where it is determined that the received instruction is not the partial cancellation instruction (Step S302; NO), the processor 11 determines whether or not the instruction is an instruction indicating that the provisional classification is approved (Step S304).

In a case where it is determined that the received instruction is the instruction indicating that the provisional classification is approved (Step S304; YES), the processor 11 confirms the provisional classification as the classification (Step S305) and displays the original image of the form (Step S306). Thus, the user can view the original image G0 illustrated in FIG. 17B, for example.

The processor 11 determines whether or not the form is provisionally classified for a folder other than the folder designated by the user, that is, the other classification destination (Step S307).

In a case where it is determined that the form is not provisionally classified for the other classification destination (Step S307; NO), the processor 11 ends the process.

In a case where it is determined that the form is provisionally classified into the other classification destination (Step S307; YES), the processor 11 cancels the provisional classification for the other classification destination (Step S308), and ends the process.

In Step S304, in a case where it is determined that the received instruction is not an instruction indicating that the provisional classification is approved (Step S304; NO), the processor 11 instructs the terminal 2 to delete the displayed screen. In addition, the processor 11 cancels the above-described provisional classification of the form into the type corresponding to the folder designated by the user (Step S309). Thus, for example, in the window W1 illustrated in FIG. 13, the icon indicating the form of which the provisional classification is canceled is deleted together with the mark K and becomes invisible to the user.

The processor 11 determines whether or not all the classifications for the above-described forms, including the confirmed classification and the provisional classification, have been canceled (Step S310).

In a case where it is determined that all the classifications have been canceled (Step S310; YES), the processor 11 classifies the above-described image of the form into an unclear document (Step S311), and notifies the administrator of the information processing system 9 of the message indicating that the image of the form is classified into the unclear document (Step S312).

In a case where it is determined that not all of the classifications have been canceled, that is, any of the classifications remains uncancelled (Step S310; NO), the processor 11 ends the process.

By performing the above operation, in the information processing system 9, the information processing apparatus 1 sets at least a portion of the image of the form at the classification destination which is provisionally classified. Thus, the information processing apparatus 1 can prevent the information leakage of the image in a case where there is an error in the classification of the image of the form.

MODIFICATION EXAMPLES

The exemplary embodiment has been described above, but the content of the exemplary embodiment may be modified as follows. The modification examples as follows may be combined with each other.

1

In the above-described exemplary embodiment, the information processing apparatus 1 includes the processor 11 configured by a CPU, but a control unit that controls the information processing apparatus 1 may have another configuration. For example, the information processing apparatus 1 may include various processors and the like in addition to the CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

2

In the embodiments above, the term "processor" is broad enough to encompass one processor or plural processors in collaboration which are located physically apart from each other but may work cooperatively.

The order of operations of the processor is not limited to one described in the embodiments above, and may be changed.

3

In the above-described exemplary embodiment, the information processing apparatus 1 may have the function of the terminal 2. In this case, the information processing apparatus 1 may have a configuration corresponding to the operation unit 24 and the display unit 25 in the terminal 2. The image scanning device 4 may have the function of the terminal 2.

4

In the above-described exemplary embodiment, in a case where the image of the form is provisionally classified into a plurality of types, the processor 11 may not notify the user in charge of any of the types, but notify the user.

Figure 18:
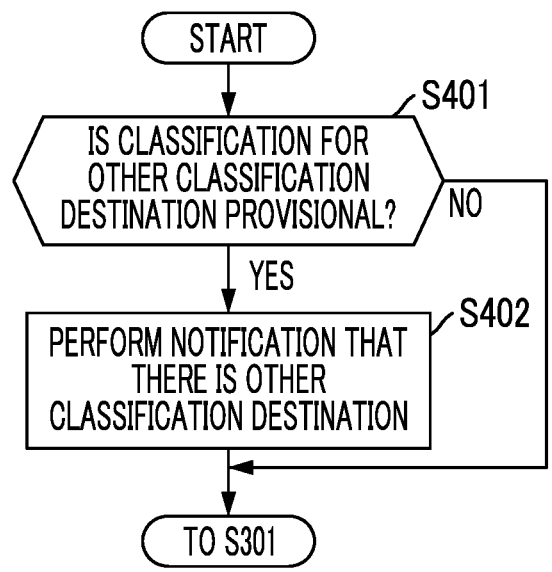
FIG. 18 is a diagram illustrating an example of a flow of a notification operation in a case of being classified into a plurality of types.

FIG. 18 is a diagram illustrating an example of a flow of a notification operation in a case of being classified into a plurality of types. Prior to Step S301, the processor 11 determines whether or not the image of the form intended to be checked by the user is provisionally classified into another classification destination (Step S401).

In a case where it is determined that the image of the form is provisionally classified into another classification destination (Step S401; YES), the processor 11 notifies the user that there is another classification destination (Step S402). Then, the process proceeds to Step S301.

For example, in a case where the image of the form is provisionally classified into a type other than the type called by the type name "ordering sheet" for the user in charge of the type called by the type name "ordering sheet", the information processing apparatus 1 may instruct the terminal 2 to display a message that this form is classified into another classification" to the user. Thus, the user can know the possibility that the form being checked is to be classified into a type other than the type for the responsibility of the user.

In a case where it is determined that the image of the form is not provisionally classified by another classification destination (Step S401; NO), the processor 11 proceeds to the process in Step S301 without performing Step S402.

5

In the above-described exemplary embodiment, in a case where the processor 11 receives, from the user, an instruction to cancel at least a portion of the unclarifying process, the processor 11 cancels the unclarifying process in response to the instruction. However, in a case of satisfying other conditions, the processor may cancel the unclarifying process in accordance with the contents of the other conditions. For example, in a case where a predetermined time has elapsed from the display of the unclear image, the processor 11 may cancel the unclarifying process so that at last a portion of the unclear region in the unclear image is brought back to being clear.

That is, the processor 11 is an example of a processor that, in a case of satisfying a predetermined condition, cancels the unclarifying process on at least a portion of the region in accordance with the contents of the condition.

6

In the above-described exemplary embodiment, the processor 11 partially cancels the unclarifying process by enlarging the region in the unclear image, which is not unclarified. The processor 11 may partially cancel the unclarifying process on a region that is not continuous with the unclarified region.

For example, in a case where the element used in classification is a text string, the processor 11 may partially cancel the unclarifying process on a region in which a text string having the same size as the above text string is displayed.

7

In the above-described exemplary embodiment, the processor 11 performs the unclarifying process on the region in which at least one element is displayed except for the element defined by the rule used in the classification. The processor may perform the unclarifying process on a region having a predetermined relation with the element defined by the rule used in the classification.

For example, in a case where the element used in the classification is a layout, the processor 11 may perform the unclarifying process on a region in which only text is displayed.

That is, the processor 11 is an example of a processor that performs a process of setting a region having a predetermined relation with the element defined by the rule used in the classification to be unclear, in an image of a classified form.

8

In the above-described exemplary embodiment, the program executed by the processor 11 of the information processing apparatus 1 is an example of a program causing a computer including a processor to perform a step of classifying an acquired image by using a rule in which an element of an image, which is common in each type of a form shown by the image, is defined, and a step of performing a process of setting a region in which at least one element is displayed except for the element defined by the rule used in classification in the classified image, to be unclear, and causing a display device to display the processed image.

The program may be provided in a state of being stored in a recording medium that can be read by a computer device, such as a magnetic recording medium such as a magnetic tape and a magnetic disk, an optical recording medium such as an optical disk, an optical magnetic recording medium, and a semiconductor memory. The program may be downloaded via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   classify an acquired image by using a rule in which an element of an image, which is common in each type of a form shown by the image, is defined;
   perform an unclarifying process of setting a region in which at least one element other than the element defined by the rule used in classification in the classified image is displayed, to be unclear, and cause a display device to display the processed image; and
   after completing the unclarifying process, cancel the unclarifying process on at least a portion of the region in accordance with a content of a predetermined condition in a case where the predetermined condition is satisfied.

2. The information processing apparatus according to claim 1, wherein the processor is configured to:
   in a case where the unclarifying process is canceled, notify a predetermined notification destination of a message indicating the cancellation of the unclarifying process.

3. The information processing apparatus according to claim 1, wherein the processor is configured to:
   receive an instruction to cancel the unclarifying process on the region, from a user; and
   in a case where the instruction to cancel the unclarifying process is received from the user, cancel the unclarifying process.

4. The information processing apparatus according to claim 2, wherein the processor is configured to:
   receive an instruction to cancel the unclarifying process on the region, from a user; and
   in a case where the instruction to cancel the unclarifying process is received from the user, cancel the unclarifying process.

5. The information processing apparatus according to claim 3, wherein the processor is configured to:
   in a case where the user is authenticated, receive the instruction to cancel the unclarifying process.

6. The information processing apparatus according to claim 4, wherein the processor is configured to:
   in a case where the user is authenticated, receive the instruction to cancel the unclarifying process.

7. The information processing apparatus according to claim 1, wherein the processor is configured to:
   perform the unclarifying process of setting another region having a predetermined relation with the element defined by the rule used in the classification in the classified image to be unclear, and cause the image to be displayed.

8. The information processing apparatus according to claim 2, wherein the processor is configured to:
   perform the unclarifying process of setting another region having a predetermined relation with the element defined by the rule used in the classification in the classified image to be unclear, and cause the image to be displayed.

9. The information processing apparatus according to claim 1, wherein the processor is configured to:

in a case where a plurality of candidates for a classification destination of the acquired image are provided, classify the image into each of a plurality of types; and in a case where the image is classified into the plurality of types, notify a user of information regarding the classification of the image in a form different from a form in a case where the image is classified into one type.

10. The information processing apparatus according to claim 9, wherein the processor is configured to:

in a case where the image is classified into a plurality of types, receive an instruction for whether or not the classification of the image is approved for each of the plurality of types, from a user; and in a case where an instruction indicating that the classification of the image into any one type among the plurality of types is approved is received, cancel the classification of the image into other types among the plurality of types.

11. The information processing apparatus according to claim 1, wherein the processor is configured to:

in a case where an instruction indicating that the classification of the image into one type is not approved is received, cancel the classification of the image into the one type.

12. The information processing apparatus according to claim 10, wherein the processor is configured to:

in a case where the instruction indicating that the classification of the image into any of the plurality of types is not approved at all is received, cancel the classification of the image into any of the plurality of types, and notify a predetermined notification destination that the type of the image is unknown.

13. A non-transitory computer readable medium storing a program causing a computer having a processor to execute a process comprising:

classifying an acquired image by using a rule in which an element of an image, which is common in each type of a form shown by the image, is defined; and performing an unclarifying process of setting a region in which at least one element other than the element defined by the rule used in classification in the classified image is displayed, to be unclear, and causing a display device to display the processed image; and after completing the unclarifying process, cancel the unclarifying process on at least a portion of the region in accordance with a content of a predetermined condition in a case where the predetermined condition is satisfied.

* * * * *